United States Patent
Loesch et al.

(10) Patent No.: US 11,397,255 B2
(45) Date of Patent: Jul. 26, 2022

(54) RADAR APPARATUS AND METHOD FOR OPERATING A RADAR APPARATUS

(71) Applicant: Robert Bosch GmbH, Stuttgart (DE)

(72) Inventors: Benedikt Loesch, Stuttgart (DE); Volker Gross, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 16/766,668

(22) PCT Filed: Nov. 15, 2018

(86) PCT No.: PCT/EP2018/081480
§ 371 (c)(1),
(2) Date: May 22, 2020

(87) PCT Pub. No.: WO2019/141406
PCT Pub. Date: Jul. 25, 2019

(65) Prior Publication Data
US 2021/0364614 A1    Nov. 25, 2021

(30) Foreign Application Priority Data
Jan. 18, 2018   (DE) .......................... 102018200751.9

(51) Int. Cl.
*G01S 13/00* (2006.01)
*G01S 7/40* (2006.01)
(Continued)

(52) U.S. Cl.
CPC .............. *G01S 13/003* (2013.01); *G01S 7/40* (2013.01); *G01S 13/42* (2013.01); *G01S 13/878* (2013.01);
(Continued)

(58) Field of Classification Search
CPC .......... G01S 13/003; G01S 7/40; G01S 13/42; G01S 13/878; G01S 13/931; G01S 2013/0263
(Continued)

(56) References Cited

U.S. PATENT DOCUMENTS 6,124,828 A  *   9/2000   Champeau ............. H04K 3/228
                                                   342/368
8,868,145 B2 *  10/2014   Rofougaran ........... H04B 15/00
                                                   455/63.4
(Continued)

FOREIGN PATENT DOCUMENTS

DE    102014219113 A1      3/2016
DE    102014219113 A1 *    3/2016   ........... G01S 13/003
(Continued)

OTHER PUBLICATIONS

Guetlein Johanna et al. ("Calibration strategy for a TDM FMCW MIMO radar system", 2013 IEEE International Conference on Microwaves, Communications, Antennas and Electronic Systems, IEEE, Oct. 21, 2013, pp. 1-5, XP032533309, DOI: 10.1109/COMCAS.2013.6685266) (Year: 2013).*
(Continued)

*Primary Examiner* — Bernarr E Gregory
*Assistant Examiner* — Nuzhat Pervin
(74) *Attorney, Agent, or Firm* — Norton Rose Fulbright Us LLP; Gerard Messina

(57) ABSTRACT

A radar device having a plurality of transmit devices and a plurality of receive devices. The transmit devices and receive devices are configured in an array having horizontal rows and vertical columns. The radar device includes a control device that is designed to determine, for an arbitrary first transmit device, a phase offset to the corresponding second transmit device, using a first radar signal that cor-
(Continued)

responds to a first radar wave sent out by the first transmit device and received by the assigned first receive device and a second radar signal that corresponds to a second radar wave sent out by the second transmit device and received by the assigned second receive device.

12 Claims, 4 Drawing Sheets

(51) Int. Cl.
    *G01S 13/42*     (2006.01)
    *G01S 13/87*     (2006.01)
    *G01S 13/931*     (2020.01)
    *G01S 13/02*     (2006.01)

(52) U.S. Cl.
    CPC ..... *G01S 13/931* (2013.01); *G01S 2013/0263* (2013.01)

(58) Field of Classification Search
    USPC .......................................................... 342/157
    See application file for complete search history.

(56) References Cited

U.S. PATENT DOCUMENTS

| | | | |
|---|---|---|---|
| 9,503,134 B2* | 11/2016 | Sadek | H04L 1/00 |
| 10,203,405 B2* | 2/2019 | Mazzaro | G01S 13/103 |
| 10,578,712 B2* | 3/2020 | Kim | G01S 7/41 |
| 10,798,539 B2* | 10/2020 | Marschalkowski | G01S 13/42 |
| 10,991,242 B2* | 4/2021 | Taylor | H04Q 9/00 |
| 11,107,352 B2* | 8/2021 | Ramot | G06Q 10/02 |
| 2008/0201033 A1* | 8/2008 | DeMersseman | G01B 21/24 |
| | | | 701/1 |
| 2011/0080313 A1* | 4/2011 | Wintermantel | G01S 7/0233 |
| | | | 342/175 |
| 2011/0156955 A1* | 6/2011 | Jeong | G01S 13/931 |
| | | | 342/359 |
| 2012/0154206 A1* | 6/2012 | Medina Sanchez | H01Q 3/267 |
| | | | 342/174 |
| 2015/0253419 A1* | 9/2015 | Alland | G01S 13/003 |
| | | | 342/385 |
| 2015/0253420 A1* | 9/2015 | Alland | G01S 7/03 |
| | | | 342/156 |
| 2016/0033632 A1* | 2/2016 | Searcy | G01S 13/424 |
| | | | 342/153 |
| 2016/0131752 A1* | 5/2016 | Jansen | G01S 13/42 |
| | | | 342/27 |
| 2016/0146931 A1* | 5/2016 | Rao | G01S 13/931 |
| | | | 342/59 |
| 2016/0285611 A1* | 9/2016 | Fischer | H04W 72/082 |
| 2016/0291146 A1* | 10/2016 | Wang | G01S 13/867 |
| 2016/0313730 A1* | 10/2016 | Ricci | A61B 5/0077 |
| 2017/0131392 A1* | 5/2017 | Schoor | G01S 13/584 |
| 2017/0141453 A1* | 5/2017 | Waelde | G01S 13/88 |
| 2017/0307744 A1* | 10/2017 | Loesch | G01S 13/06 |
| 2018/0011170 A1* | 1/2018 | Rao | G01S 13/42 |
| 2018/0166794 A1* | 6/2018 | Raphaeli | H01Q 21/28 |
| 2018/0313946 A1* | 11/2018 | Al-Alusi | G01S 13/103 |
| 2020/0280830 A1* | 9/2020 | Stirling-Gallacher | H04W 4/023 |

FOREIGN PATENT DOCUMENTS

| | | | | |
|---|---|---|---|---|
| DE | 102017223429 A1 * | 7/2018 | ........... | G01S 13/536 |
| DE | 102017118387 A1 | 2/2019 | | |
| EP | 2223154 B1 * | 11/2013 | ........... | G01S 13/931 |
| EP | 3171453 B1 * | 2/2019 | ............. | G01B 15/04 |
| EP | 2857857 B1 * | 8/2019 | ........ | G01S 13/0209 |
| JP | 2003315445 A | 11/2003 | | |
| JP | 2004085258 A | 3/2004 | | |
| JP | 2016534349 A | 11/2016 | | |
| JP | 2017521683 A | 8/2017 | | |
| WO | WO-2015120885 A1 * | 8/2015 | ............. | G01B 15/04 |

OTHER PUBLICATIONS

International Search Report for PCT/EP2018/081480, dated Feb. 22, 2019.
Guetlein Johanna et al., "Calibration Strategy for a TDM FMCW MIMO Radar System", 2013 IEEE International Conference on Microwaves, Communications, Antennasand Electronic Systems (COMCAS 2013), IEEE, 2013, pp. 1-5. XP032533309.

* cited by examiner

RADAR APPARATUS AND METHOD FOR OPERATING A RADAR APPARATUS

FIELD

The present invention relates to a radar device and a method for operating a radar device. The present invention relates in particular to a multiple-input-multiple-output (MIMO) radar device.

BACKGROUND INFORMATION

Driver assistance systems can use environmental data acquired by a radar device to calculate the distances and relative speeds of objects. Also of particular importance, however, are the azimuth angle and the elevation angle of the object, for example in order to carry out a lane assignment or to determine the relevance of the target. For example, on the basis of the elevation angle it can be determined whether the object can be driven over, driven against, or driven under. The azimuth and elevation angles of the objects can be ascertained from amplitude and/or phase differences of radar signals.

In so-called multiple-input-multiple-output (MIMO) radar devices, in contrast to conventional radar devices a plurality of transmit antennas and receive antennas are used. In this way, the virtual aperture of the overall array and the number of measurements can be increased, and costs for additional channels, as well as space on the circuit board, can be saved.

The transmit signals of the radar device must be orthogonal to one another, which can be achieved through a code division multiplexing method, a frequency division multiplexing method, or a time division multiplexing method.

U.S. Patent Application Publication No. US 2017/0131392 A1 describes an MIMO radar sensor, in which frequency ramps are sent out in an interleaved manner in an FMCW modulation method, and the reflections are received. The radar sensor facilitates the determination of the angular position of an object.

In order to achieve a desired high degree of accuracy of the angular determination, amplitude and phase differences, or offsets, must be known, or eliminated, as precisely as possible. Such offsets may arise in various ways, for example due to effective conductor lengths, i.e., due to conductors that actually have different lengths, or due to temperature differences in the various conductors.

SUMMARY

The present invention provides a radar device and a method.

According to a first aspect, the present invention accordingly relates provides a radar device. In accordance with an example embodiment of the present invention, the radar device has a plurality of transmit devices that are designed to send out radar waves, and a plurality of receive devices that are designed to receive the reflected radar waves and to output a respective radar signal. The transmit devices and receive devices are configured in an array having horizontal rows and vertical columns. A corresponding virtual array is assigned to the array. The configuration of the array is realized in such a way that a subarray of the virtual array that is assigned to an arbitrary first transmit device has at least one first virtual element that has the same horizontal position as, and a different vertical position from, at least one assigned second virtual element of a further subarray that is assigned to a second transmit device. A first receive device is assigned to the first virtual element, and a second receive device is assigned to the second virtual element. In addition, the radar device includes a control device that determines, for an arbitrary first transmit device, a phase offset to the corresponding second transmit device. For this purpose, the control device uses a first radar signal that corresponds to a first radar wave sent out by the first transmit device and received by the assigned first receive device. The control device further uses a second radar signal that corresponds to a second radar wave sent out by the second transmit device and received by the assigned second receive device.

According to a second aspect, the present invention provides a method for operating a radar device. In accordance with an example embodiment of the present invention, in the method, for an arbitrary first transmit direction, a phase offset to the corresponding second transmit direction is determined.

Preferred specific embodiments are described herein.

SUMMARY

In accordance with the present invention, a configuration of the radar elements is found that enables the phase offsets between individual transmit devices to be ascertained. This is achieved in that in the virtual array two virtual elements that are assigned to different transmit directions have identical horizontal positions. This means that the phase differences or offsets of radar waves between these two virtual antenna elements are not a function of the azimuth angle of the object. Under the assumption that the reflections from the objects take place in the middle, at sensor height, the overall phase differences are then substantially a function only of the phase offset between the transmit devices or receive devices. The phase offset is to be understood here as the different phase, which is already present given identical controlling based on different effective conductor length differences, of different transmit devices or receive devices. Because the phase synchronization at the receive side can typically be well controlled, there remain only the phase offsets between the transmit devices. These can thus be measured and compensated.

In addition, a determination of the elevation angle by the radar device is possible based on the different vertical positions. The angular position of an object can be completely determined in this way.

According to a preferred development of the example radar device, the control device is in addition designed to control, on the basis of the determined offsets between two transmit devices, the transmit devices in such a way that phase synchronization is achieved. Particularly advantageously, for this purpose no additional hardware outlay is necessary; instead, purely through signal processing, an advantageous configuration of the antenna elements phase synchronization can already be achieved at the transmit side.

According to a preferred development of the present invention, the radar device has an evaluation device that detects an object on the basis of the radar signals outputted by the receive devices, and ascertains an azimuth angle and/or elevation angle of the object. The angular position of the object can be determined precisely on the basis of the known phase offsets.

According to a preferred development of the radar device according to the present invention, the control device determines the phase offset between two transmit devices further using a vertical misalignment angle of the radar device. The vertical misalignment angle can be a fixedly specified value that describes the exact vertical orientation of the radar device installed in a vehicle. In order to enable the radar device to be used for different orientations, the misalignment angle can also be a freely specifiable parameter that can be set as a function of the accurate alignment.

According to a preferred development of the present invention, the radar device has an acceleration sensor that measures the acceleration of the radar device. The control device determines the vertical misalignment angle using the measured acceleration. Because the acceleration of the radar device is a function of the precise vertical misalignment angle, the misalignment angle can thus be determined without knowing the precise alignment.

According to some specific embodiments of the present invention, the phase offsets between the receive devices can be disregarded. According to further specific embodiments, however, the control device can also be designed to determine a phase offset between two transmit devices using a phase offset between the two assigned receive devices. While the ascertaining of the phase offsets at the transmit site is typically difficult, the ascertaining of the phase offset at the receiver side can mostly be well-controlled and set.

According to a preferred development of the radar device according to the present invention, the control device is designed to control the transmit devices and receive devices in a time division multiplexing method. In particular, in a frequency-modulated continuous wave (FMCW) method, frequency ramps are sent out in alternating fashion by the various transmit devices. In particular, the individual transmit devices and receive devices can be controlled according to the method described in U.S. Patent Application Publication No. US 2017/0131392 A1.

According to a preferred development of the radar device according to the present invention, both the vertical positions of the transmit devices and the vertical positions of the receive devices differ at least partly from one another. In this way, a better determination of the azimuth angle and elevation angle can be carried out.

DETAILED DESCRIPTION OF EXAMPLE EMBODIMENTS

Figure 1:
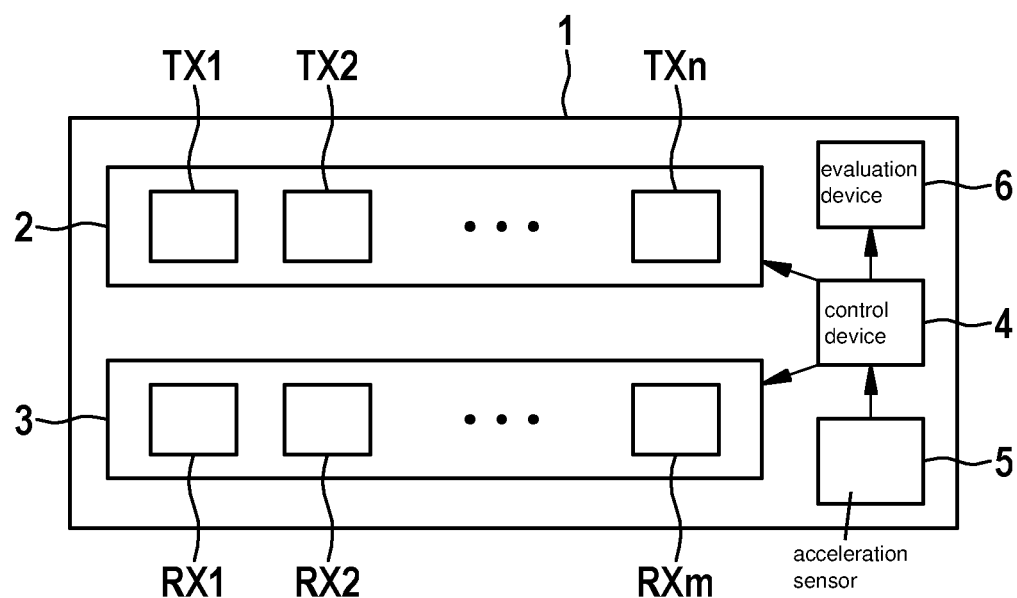
FIG. 1 shows a schematic diagram of a radar device according to a specific embodiment of the present invention.

FIG. 1 shows a schematic diagram of a radar device 1 according to a specific embodiment of the present invention. Radar device 1 can be situated in particular in a vehicle.

Radar device 1 includes a monolithically integrated circuit (MMIC) having a transmit segment 2 and a receive segment 3. Radar device 1 is fashioned as an MIMO radar device, i.e. transmit segment 2 includes a plurality of transmit devices TX1 through TXn, while receive segment 3 includes a plurality of receive devices RX1 through RXm, where n and m are each greater than or equal to two. The number of transmit devices TX1 through TXn can correspond to the number of receive devices RX1 through RXm, but may also differ therefrom.

A control device 4 is designed to control transmit devices TX1 through TXn and receive devices RX1 through RXm, for example in the form of a time division multiplexing method. Transmit devices TX1 through TXn and receive devices RX1 through RXm are configured in an array that has horizontal rows and vertical columns. An array-type configuration is to be understood as meaning that transmit devices TX1 through TXn and receive devices RX1 through RXm are oriented on a grid. The horizontal columns are oriented parallel to the driving path of the vehicle, while the vertical direction can be oriented perpendicular to the driving path. More generally, the vertical direction can also be configured so as to be rotated relative to this perpendicular direction, a misalignment angle being included here. Radar device 1 can have an acceleration sensor 5 for this purpose that measures the acceleration of radar device 1, and extracts the misalignment angle therefrom and communicates it to control device 4.

Radar device 1 has in addition an evaluation device 6 that evaluates radar signals outputted by receive devices RX1 through RXm, for example in order to detect objects. Evaluation device 6 can calculate a distance, a relative speed, an azimuth angle, and/or an elevation angle of the object on the basis of the radar signals.

Radar device 1 is distinguished by the relative configuration of receive devices RX1 through RXm and transmit devices TX1 through TXn relative to one another. In the following, this is explained on the basis of an example.

Figure 2:
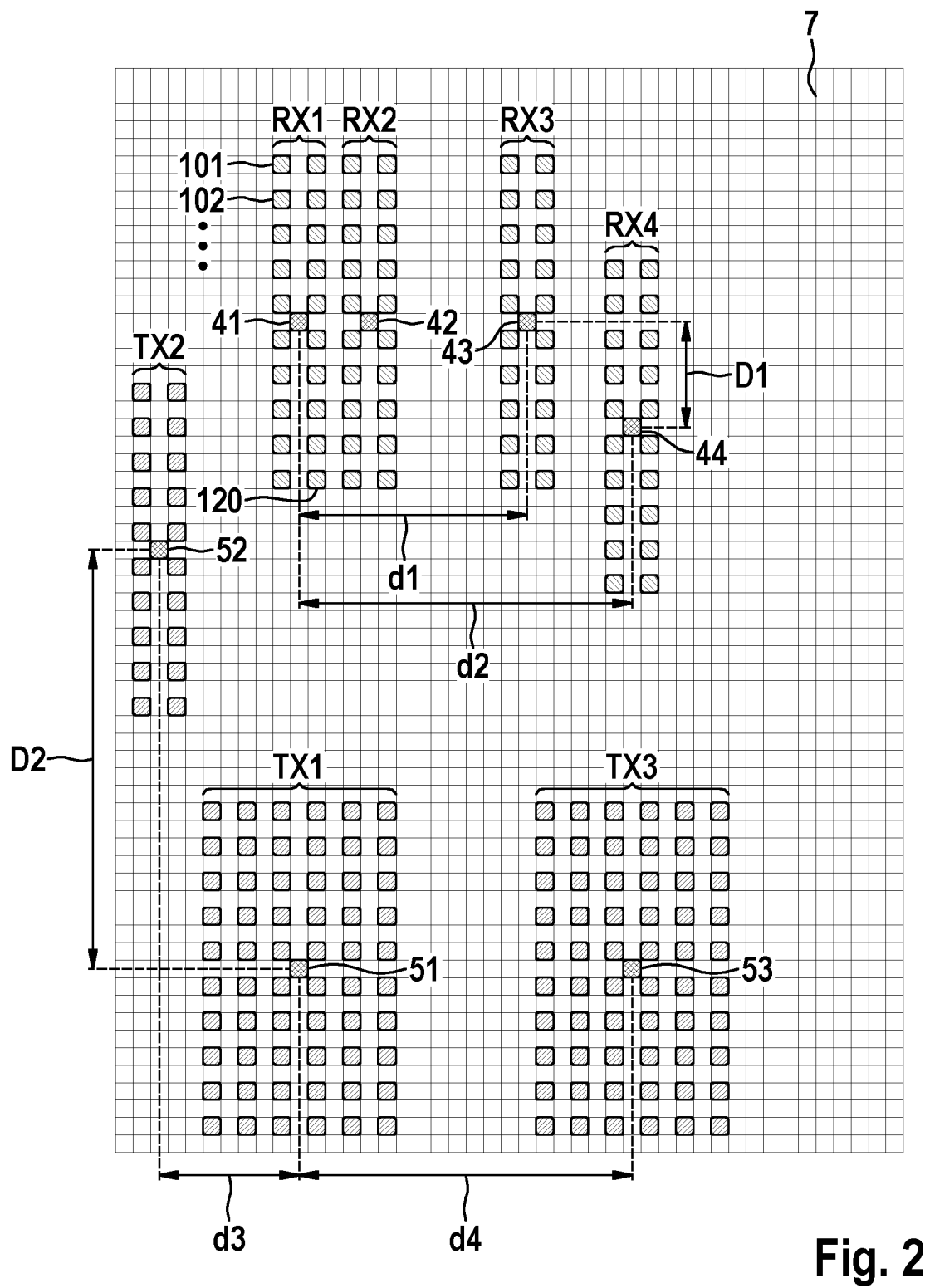
FIG. 2 shows a schematic top view of an array having transmit devices and receive devices of a radar device.

For this purpose, FIG. 2 shows three transmit devices TX1 through TX3, as well as four receive devices RX1 through RX4, configured in an array 7. Array 7 has a plurality of rows and columns, and individual radiators of the transmit devices or receive devices RX1 through RX4 are situated at particular positions. As examples, individual radiators 101 through 120 of first receive device RX1 are identified. Transmit devices TX1 through TX3, or receive devices RX1 through RX4, can thus each be realized as phased array antennas. Corresponding phase centers 51 through 53, or 41 through 44, which correspond to a center of the respective individual radiator, can be assigned to the respective transmit devices TX1 through TX3, or receive devices RX1 through RX4.

Figure 3:
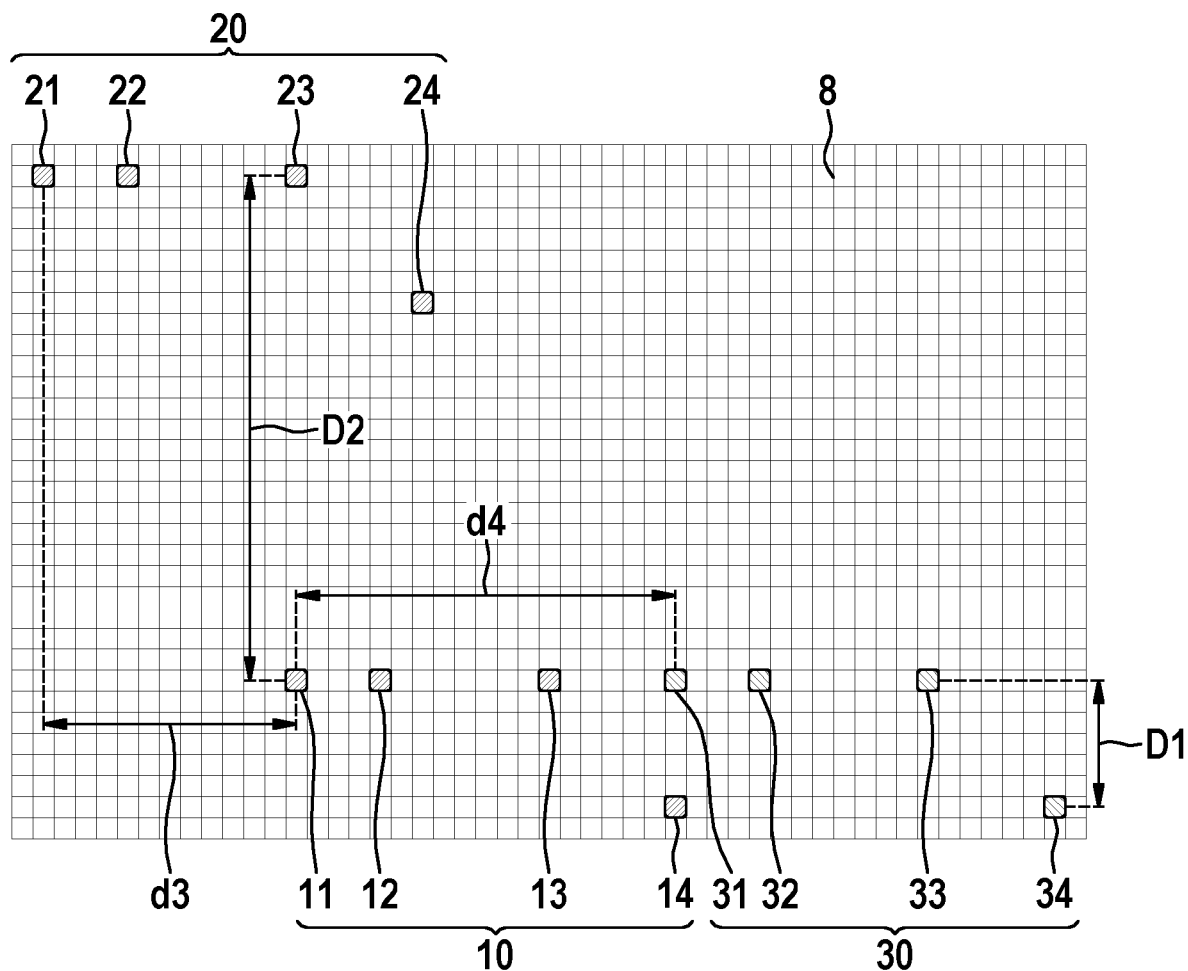
FIG. 3 shows a virtual array assigned to the array.

A virtual array 8, illustrated in FIG. 3, which is obtained through convolution of phase centers 41 through 44 of receive devices RX1 through RX4 with phase centers 51 through 53 of transmit devices TX1 through TX3, corresponds to the array 7 having transmit devices TX1 through TX3 and receive devices RX1 through RX4. This corresponds mathematically to a Kronecker product of vectors, corresponding to the phase centers, of transmit devices TX1 through TX3, or receive devices RX1 through RX4.

First transmit device TX1 corresponds to a first virtual subarray 10, second transmit device TX2 corresponds to a second virtual subarray 20, and third transmit device TX3 corresponds to a third virtual subarray 30. Each of the subarrays 10, 20, 30 has a number of virtual elements 11 through 14, 21 through 24, and 31 through 34 that corresponds to the number of receive devices RX1 through RX4, i.e. is equal to four. Thus, one receive device RX1 through RX4 can also be assigned to each virtual element.

The distances between virtual elements of a specified subarray 8 correspond to the distances between receive devices RX1 through RX4. In addition, the distances between virtual elements of different subarrays that are assigned to the same receive device RX1 through RX4 correspond to the distances between the assigned transmit devices TX1 through TX3.

Transmit devices TX1 through TX3 and receive devices RX1 through RX4 are configured in such a way that each subarray includes a virtual element that has the same horizontal position as, and has a different vertical position from, at least one, and preferably exactly one, further virtual element of a further subarray.

In the design shown in FIG. 2, for example a first horizontal distance d1 between phase center 41 of first receive device RX1 and phase center 43 of third receive device RX3 corresponds exactly to a third horizontal distance d3 between phase center 52 of second transmit device TX2 and phase center 51 of first transmit device TX1. In addition, a second horizontal distance d2 between phase center 41 of first receive device RX1 and phase center 44 of fourth receive device RX4 corresponds exactly to a fourth horizontal distance d4 between phase center 51 of first transmit device TX1 and phase center 53 of third transmit device TX3. In addition, first through third receive devices RX1 through RX3 are situated at the same vertical position, while fourth receive device RX4 has a first vertical distance D1 therefrom. First transmit device TX1 and third transmit device TX3 are situated at the same vertical position, while second transmit device TX2 has a second vertical distance D2 from first transmit device TX1 and from third transmit device TX3.

This design brings it about that in virtual array 8, a virtual element 23 of second subarray 20 that is assigned to second transmit device TX2 and to third receive device RX3 has the same horizontal position as, and has a vertical distance equal to second vertical distance D2 from, a virtual element 11 of first subarray 10 that is assigned to first transmit device TX1 and to first receive device RX1.

In the same way, a virtual element 31 of third subarray 30 that is assigned to third transmit device TX3 and to first receive device RX1 has the same horizontal position as, and a vertical position offset by first vertical distance D1 relative to, a virtual element 14 of first subarray 10 that is assigned to first transmit device TX1 and to fourth receive device RX4.

In a certain way, virtual elements 11 and 23 thus link first subarray 10 to second subarray 20, and virtual elements 14 and 31 link first subarray 10 to third subarray 30.

For each two virtual elements situated at the same horizontal position, control device 4 can calculate the phase offsets of the assigned transmit devices TX1 through TXn.

In general, the average phase offset:

$$\overline{\Delta\phi}$$

can be represented as the sum of a phase offset based on the misalignment angle:

$$\Delta\phi_{dej}$$

with a phase offset of the assigned transmit devices TX1 through TXn:

$$\Delta\phi_{tx}$$

as well as a phase offset of the assigned receive devices RX1 through RXm:

$$\Delta\phi_{rx}$$

Therefore, the following holds:

$$\overline{\Delta\phi}=\Delta\phi_{dej}+\Delta\phi_{rx}+\Delta\phi_{tx}.$$

This equation can be solved for the phase offset of transmit devices TX1 through TXn:

$$\Delta\phi_{tx}=\overline{\Delta\phi}-\Delta\phi_{dej}-\Delta\phi_{rx}$$

The misalignment angle, or the phase offset based on the misalignment angle, can be a specified value that can be stored in a storage device of radar device 1. Alternatively, the misalignment angle, or the phase offset based on the misalignment angle, can be determined by acceleration sensor 5. In addition, the misalignment angle can be determined using the phase difference between two further transmit devices TX1 through TXn.

To a first approximation, the phase offset of receive devices RX1 through RXm can be disregarded. According to further specific embodiments, the phase offset of receive devices RX1 through RXm can be determined in different ways. The average phase offset can then be determined by controlling the respective pairs of transmit devices TX1 through TXn and assigned receive devices RX1 through RXm. Transmit device TX1 through TXn of the first pair accordingly sends out a first radar wave that is received by receive device RX1 through RXm of the first pair, a corresponding first radar signal being outputted. In addition, transmit device TX2 through TXn of the second pair sends out a second radar wave that is received by receive device RX1 through RXm of the second pair, a second radar signal being outputted. The average phase offset corresponds to the phase difference between the first and second radar signal.

By filling in the values, control device 4 can use the above equation to calculate the phase offset between transmit devices TX1 through TXn.

The phase offsets can be more generally further influenced by the object movement. A phase offset caused by this can however be compensated by control device 4 using modulation methods, or by tracking the object.

In the described manner, control device 4 can thus calculate the phase offset between first transmit device TX1 and second transmit device TX2, and can calculate the phase offset between first transmit device TX1 and third transmit device TX3. Through difference formation, in this way the phase offset between second transmit device TX2 and third transmit device TX3 can also be calculated.

Control device 4 is designed to adapt, on the basis of the calculated phase offsets, the control signals of transmit devices TX1 through TXn, or receive devices RX1 through RXm, in such a way that phase synchronization is achieved.

Preferably, all transmit devices TX1 through TXn are connected to one another by chains of linked virtual elements, so that the phase offsets can be calculated between any two transmit devices TX1 through TXn. In particular, the present invention is not limited to three transmit devices TX1 through TX3 and four receive devices RX1 through RX4.

According to further specific embodiments, the characteristics of transmit devices TX1 through TXn, or receive devices RX1 through RXm, as well as their precise positioning in array 7, can be adapted to the respective application. For example, a front sensor having a larger range and a specified field of view can be realized, for example by realizing second transmit device TX2 as a focusing antenna. In addition, for example all transmit devices TX1 through TXn and receive devices RX1 through RXm can be realized having a broad radiation characteristic.

Figure 4:
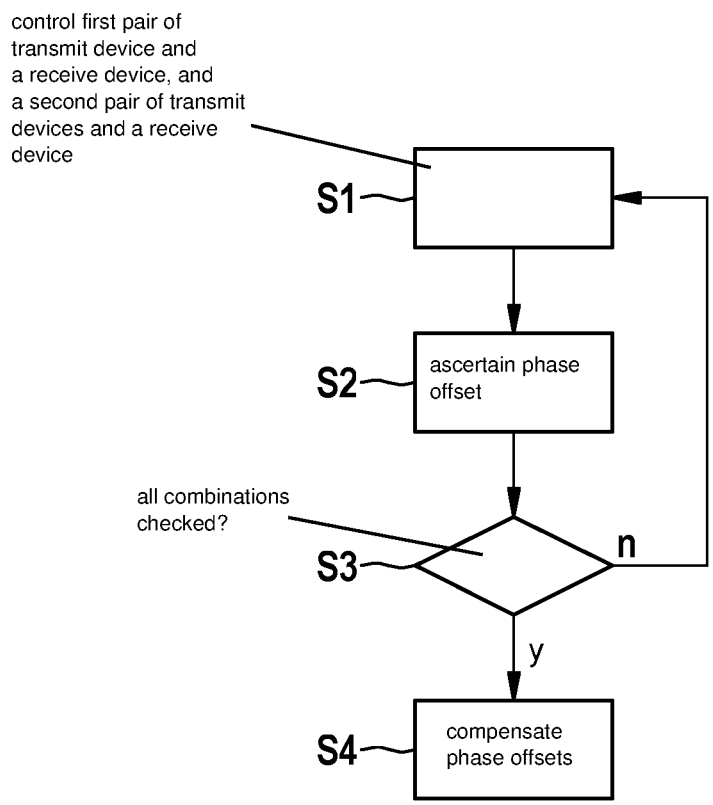
FIG. 4 shows a flow diagram of an example method for operating a radar device.

FIG. 4 shows a flow diagram of an example method for operating a radar device 1 that is realized according to one of the specific embodiments described above.

For this purpose, in a first method step S1 a first pair of a transmit device TX1 through TXn and a receive device RX1 through RXm, and a second pair of a transmit device TX1 through TXn and a receive device RX1 through RXm, of radar device 1 are respectively controlled, a virtual element assigned to the first pair having the same horizontal position as, and a different vertical position from, a virtual element that is assigned to the second pair.

In this way, according to the procedure described above, in a second method step S2 the phase offset between transmit device TX1 through TXn of the first pair and transmit device TX1 through TXn of the second pair can be ascertained.

In a method step S3, it is checked whether all combinations of such pairs have already been checked. If this is not the case, steps S1 and S2 are repeated for a further combination of such pairs.

Otherwise, in a method step S4 phase synchronization is achieved by compensating the phase offsets.

What is claimed is:

1. A radar device for a vehicle, comprising:
    a plurality of transmit devices configured to send out radar waves;
    a plurality of receive devices configured to receive reflected radar waves and to output a respective radar signal, wherein the transmit devices and the receive devices are in an array having horizontal rows and vertical columns so that, in a corresponding virtual array, a subarray assigned to an arbitrary first one of the transmit devices has at least one first virtual element that has a same horizontal position as, and a different vertical position from, at least one assigned second virtual element of a further subarray assigned to a second one of the transmit devices, a first one of the receive devices being assigned to the first virtual element and a second one of the receive devices being assigned to the second virtual element; and
    a control device to determine, for the arbitrary first one of the transmit devices, a phase offset to the corresponding second one of the transmit devices, using a first radar signal that corresponds to a first radar wave sent out by the arbitrary first one of the transmit devices and received by the assigned first one of the receive devices and a second radar signal that corresponds to a second radar wave sent out by the second one of the transmit devices and received by the assigned second one of the receive devices;
    wherein the radar device includes a MIMO radar device, wherein the plurality of the transmit devices are in a transmit segment, and wherein the plurality of the receive devices are in a receive segment,
    wherein the array of transmit devices and receive devices are oriented on a grid, and
    wherein a misalignment angle or a phase offset based on the misalignment angle is at least one of the following: (i) a specified value stored in a storage device of the radar device; (ii) determined by an acceleration sensor; and/or (iii) determined using the phase difference between two further transmit devices.

2. The radar device as recited in claim 1, wherein the control device is further configured to control, based on the determined phase offsets between two transmit devices, the transmit devices in such a way that phase synchronization is achieved.

3. The radar device as recited in claim 1, further comprising:
    an evaluation device to detect an object on the basis of the radar signals outputted by the receive devices and to ascertain an azimuth angle and/or elevation angle of the object.

4. The radar device as recited in claim 1, wherein the control device is further configured to determine the phase offset between two of the transmit devices further using a vertical misalignment angle of the radar device.

5. The radar device as recited in claim 4, further comprising:
    an acceleration sensor to measure an acceleration of the radar device, wherein the control device is configured to determine the vertical misalignment angle of the radar device using the measured acceleration.

6. The radar device as recited in claim 1, wherein the control device is configured to determine the phase offset between two of the transmit devices using a phase offset between two assigned receive devices.

7. The radar device as recited in claim 1, wherein the control device is configured to control the transmit devices and receive devices in a time division multiplexing method.

8. The radar device as recited in claim 1, wherein vertical positions of the transmit devices differ at least in part from one another, and the vertical positions of the receive devices differing at least in part from one another.

9. A method for operating a radar device for a vehicle, the radar device including a plurality of transmit devices configured to send out radar waves, a plurality of receive devices configured to receive reflected radar waves and to output a respective radar signal, the method comprising:
    determining a phase offset of an arbitrary first one of the transmit devices to a corresponding second one of the transmit devices;
    wherein the transmit devices and the receive devices are in an array having horizontal rows and vertical columns so that, in a corresponding virtual array, a subarray assigned to the arbitrary first one of the transmit devices has at least one first virtual element that has a same horizontal position as, and has a different vertical position from, at least one assigned second virtual element of a further subarray assigned to the second one of the transmit devices,
    wherein a first one of the receive devices is assigned to the first virtual element and a second one of the receive devices is assigned to the second virtual element, and a control device to determine, for the arbitrary first one of the transmit devices, a phase offset to the corresponding second one of the transmit devices, using a first radar signal that corresponds to a first radar wave sent out by the arbitrary first one of the transmit devices and received by the assigned first one of the receive devices and a second radar signal that corresponds to a second radar wave sent out by the second one of the transmit devices and received by the assigned second one of the receive devices,
    wherein the radar device includes a MIMO radar device, wherein the plurality of the transmit devices are in a transmit segment, and wherein the plurality of the receive devices are in a receive segment,
    wherein the array of transmit devices and receive devices are oriented on a grid, and
    wherein a misalignment angle or a phase offset based on the misalignment angle is at least one of the following: (i) a specified value stored in a storage device of the radar device; (ii) determined by an acceleration sensor; and/or (iii) determined using the phase difference between two further transmit devices.

10. The method as recited in claim 9, wherein the transmit devices are controlled based on the determined phase offsets between two of the transmit devices so that phase synchronization is achieved.

11. The method as recited in claim 9, wherein the transmit segment and the receive segment are in a monolithically integrated circuit, and wherein a horizontal direction is oriented parallel to a driving path of the vehicle, and wherein a vertical direction is oriented perpendicularly to the driving path.

12. The radar device as recited in claim 1, wherein the transmit segment and the receive segment are in a monolithically integrated circuit, and wherein a horizontal direction is oriented parallel to a driving path of the vehicle, and wherein a vertical direction is oriented perpendicularly to the driving path.

* * * * *